US012761892B2

(12) United States Patent
Harper et al.

(10) Patent No.: US 12,761,892 B2
(45) Date of Patent: Oct. 13, 2026

(54) SYSTEM AND METHOD FOR SERVICE MANAGEMENT AND CONTAINER ORCHESTRATION WITHIN A HOST ENVIRONMENT

(71) Applicant: Vertiv IT Systems, Inc., Huntsville, AL (US)

(72) Inventors: Kenneth Harper, Coral Springs, FL (US); Bradley Lanford, Toney, AL (US)

(73) Assignee: Vertiv Corporation, Westerville, OH (US)

( * ) Notice: Subject to any disclaimer, the term of this patent is extended or adjusted under 35 U.S.C. 154(b) by 219 days.

(21) Appl. No.: 17/878,299

(22) Filed: Aug. 1, 2022

(65) Prior Publication Data

US 2023/0044016 A1 Feb. 9, 2023

Related U.S. Application Data

(60) Provisional application No. 63/228,808, filed on Aug. 3, 2021.

(51) Int. Cl.
*G06F 8/65* (2018.01)
*G06F 9/445* (2018.01)

(52) U.S. Cl.
CPC ............ *G06F 8/65* (2013.01); *G06F 9/44505* (2013.01)

(58) Field of Classification Search
CPC ............................... G06F 8/65; G06F 9/44505
See application file for complete search history.

(56) References Cited

U.S. PATENT DOCUMENTS 10,261,782 B2 * 4/2019 Suarez ...................... G06F 8/63
11,385,888 B1 * 7/2022 Wu ..................... G06F 9/45558
(Continued)

FOREIGN PATENT DOCUMENTS

WO WO-2021091594 A1 * 5/2021 ............. H04L 67/34

OTHER PUBLICATIONS

Kehrer, Stefan, and Wolfgang Blochinger. "TOSCA-based container orchestration on Mesos: two-phase deployment of cloud applications using container-based artifacts." Computer science-research and development 33 (2018): 305-316. (Year: 2018).*
(Continued)

*Primary Examiner* — Joanne G Macasiano
(74) *Attorney, Agent, or Firm* — Suiter Swantz IP

(57) ABSTRACT

A system and method for service management and container orchestration (SMCO) within a host environment provides a manifest builder for retrieving containers and configuration tools to generate manifest artifacts for a subsequent update (e.g., full or partial) of one or more applications running on the host environment. At runtime, if the host environment is without a network connection to an external repository, the SMCO system includes a manifest launcher for consuming manifest artifacts to load containers for installation or update of the associated applications to local container registries within the host environment as provided by the configuration tools in the manifest artifacts. Further, the manifest launcher configures the container runtime environment (CRE) and/or host operating system (OS) within the host environment according to a desired state of the application.

12 Claims, 6 Drawing Sheets

(56) References Cited

U.S. PATENT DOCUMENTS

| | | | | |
|---|---|---|---|---|
| 11,487,591 | B1 * | 11/2022 | Featonby | G06F 9/45558 |
| 12,190,144 | B1 * | 1/2025 | Featonby | H04L 67/568 |
| 2017/0147319 | A1 * | 5/2017 | Riek | H04L 67/06 |
| 2017/0300697 | A1 * | 10/2017 | Iyer | G06F 8/63 |
| 2018/0191782 | A1 * | 7/2018 | Djordjevic | H04L 63/0853 |
| 2021/0019163 | A1 * | 1/2021 | Taylor | G06F 8/63 |
| 2021/0255846 | A1 * | 8/2021 | Mamgain | H04L 67/34 |
| 2022/0326929 | A1 * | 10/2022 | Sharma | H04L 63/08 |
| 2023/0008064 | A1 * | 1/2023 | Gau | G05B 19/41885 |
| 2023/0008839 | A1 * | 1/2023 | Henry | G06F 8/61 |
| 2023/0025529 | A1 * | 1/2023 | Fu | G06F 9/4406 |
| 2023/0315888 | A1 * | 10/2023 | Ishida | G06F 8/60 726/26 |

OTHER PUBLICATIONS

Bruzual Balzan, Daniel. "Distributed Computing Framework Based on Software Containers for Heterogeneous Embedded Devices." (2017). (Year: 2017).*

Zhou, Naweiluo, et al. "Container orchestration on HPC systems through Kubernetes." Journal of Cloud Computing 10 (Feb. 2021): 1-14. (Year: 2021).*

Galic, Petar. "The Design and Experimental Use of CReB, a Container Registry Benchmark." Diss. Universiteit van Amsterdam (2020). (Year: 2020).*

Khan, Asif. "Key characteristics of a container orchestration platform to enable a modern application." IEEE cloud Computing 4.5 (2017): 42-48. (Year: 2017).*

Anonymous: "Software deployment—Wikipedia", Jul. 28, 2021 (Jul. 28, 2021), pp. 1-4, XP093272446, Retrieved from the Internet: URL:https://en.wikipedia.org/w/index.php?title=Software_deployment&oldid=1035976520.

European Extended Search Report received in EP Application No. 22853808.8, May 12, 2025, 11 pages.

* cited by examiner

SYSTEM AND METHOD FOR SERVICE MANAGEMENT AND CONTAINER ORCHESTRATION WITHIN A HOST ENVIRONMENT

CROSS-REFERENCE TO RELATED APPLICATIONS

The present application claims the benefit under 35 U.S.C. § 119(e) of U.S. Provisional Patent Application Ser. No. 63/228,808, filed Aug. 3, 2021, entitled SYSTEM AND METHOD FOR SERVICE MANAGEMENT AND CONTAINER ORCHESTRATION IN AN EMBEDDED HARDWARE PRODUCT, and naming Kenneth Harper and Bradley Lanford as inventors. Said U.S. Provisional Patent Application 63/228,808 is incorporated herein by reference in its entirety.

TECHNICAL FIELD

The present disclosure relates generally to containerized application services, and more particularly to service management and container orchestration of applications configured to execute within a host environment.

BACKGROUND

Containers are becoming the new standard for deploying and managing software. Container orchestration software/platforms (e.g., Kubernetes, VMware) automate application deployment, scaling, and management and the operations of application containers across a cluster of hosts (e.g., servers) or within a host appliance, e.g., an embedded hardware device. Containers are self-contained execution environments (e.g., isolated from other programs or applications) wherein one or more applications, and all dependencies associated with each application, can be packaged into a single file and shared. Kubernetes, for example, wraps one or more containers into a higher-level structure (e.g., a "Pod") that may be housed on one or more nodes (e.g., a "cluster" or pool of nodes). A "node" represents a single machine, i.e., the smallest possible unit of computing hardware. The machine corresponding to a node may be a virtual machine (VM) or a physical machine, e.g., a server or other appliance.

A server or other embedded hardware device may include a container manager responsible for managing the suite of containers running on a machine or system of machines. For example, when applications are added, removed, or updated, it may be necessary for the container runtime environment to be configured or reconfigured, and/or for other applications to be patched, e.g., updating of the application/s, loading/restarting/monitoring of any new or updated containers associated with the application/s, cleaning up of unused containers. Conventionally, microservice containers are downloaded from a container registry via a network connection.

In some cases, however, an embedded hardware device may not have access to a network connection. For example, the device may be a new appliance or recently flashed or reset to factory default settings. In the case of virtualized or cloud-based environments, containers or services configured for execution per one or more applications may exit (e.g., cease to run) and require restarting, e.g., due to entering or persisting in an unhealthy state. An application may require rolling back subsequent to an update or upgrade, e.g., if one or more associated containers are associated with unhealthy or failure states. Further, dependence on external registries for container retrieval may leave the environment at risk of tampered containers, lack of available registries, or other denial of service type scenarios. Accordingly, it may be advantageous for an application package to remedy the shortcomings of the conventional approaches identified above.

SUMMARY

In a first aspect, embodiments of the inventive concepts disclosed herein are directed to a system and method for service management and container orchestration (SMCO) within a host environment. The SMCO system according to embodiments of the inventive concepts disclosed herein is configured to generate application artifacts associated with an application configured for execution on the host environment. The application artifacts may be launched by the SMCO system to install or update the associated applications entirely within the host environment, eliminating the need to download containers or configuration tools from an external repository via a network connection at runtime. For example, the SMCO system includes manifest artifacts for each application running on the host environment to be updated, each manifest artifact loadable to the host environment and including container images and configuration tools. The SMCO system includes a manifest launcher for updating the application in the container runtime environment (CRE) of the host environment by consuming the manifest artifacts. Containers are generated by the manifest launcher based on the container images and loaded into local container registries of the host environment as provided for by the configuration tools. The manifest launcher additionally configures the CRE or host operating system (OS) running on the host environment according to a desired state of the updating/updated application.

In some embodiments, the host environment includes a server, physical appliance, or other like embedded hardware product; a distributed environment (e.g., a collection of physically network nodes or a cloud-based processing environment); or a virtualized environment or virtual appliance (e.g., a logical partition of a physical processing environment).

In some embodiments, the manifest launcher removes unused CRE objects from local container registries subsequent to the application update.

In some embodiments, unused CRE objects include unused containers, unused container images, and/or unused configuration tools.

In some embodiments, the host environment is unconnected to an external network at runtime.

In some embodiments, the manifest artifacts are associated with a full application update, e.g., to a current version of the application.

In some embodiments, the manifest artifacts are associated with a partial or patch application update dependent on a prior application version and capable of updating only the prior version of the application to the current version.

In some embodiments, the SMCO system includes a manifest builder connectible to remote registries. For example, the manifest builder retrieves configuration tools and containers from the remote registries and generates container images based on the containers and in the appropriate container image format. Based on the retrieved configuration tools and generated container images, the manifest builder generates manifest artifacts loadable to the host environment for a subsequent runtime (e.g., when the SMCO system may be without network access).

In a further aspect, a method for service management and container orchestration (SMCO) is disclosed. In embodiments, the method includes retrieving at a build time, via a manifest builder of a SMCO system, a manifest launcher connected to remote registries, the manifest launcher including containers and configuration tools for applications to be installed within the host environment. The method includes generating, at the build time, container images from the retrieved containers via the manifest builder. The method includes generating via the manifest builder, at the build time, manifest artifacts based on the container images and configuration tools. The method includes, at a run time subsequent to the build time and via a manifest launcher, updating (e.g., either fully or partially) an application within a container runtime environment (CRE) of the host environment when the host environment is not connected to any remote registries via network by extracting containers from the manifest artifacts to a local container registry of the CRE as provided for by the configuration tools. The method includes configuring, at the run time, the CRE and/or host operating system (OS) based on a desired state of the updated application.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures.

DETAILED DESCRIPTION

Figure 1:
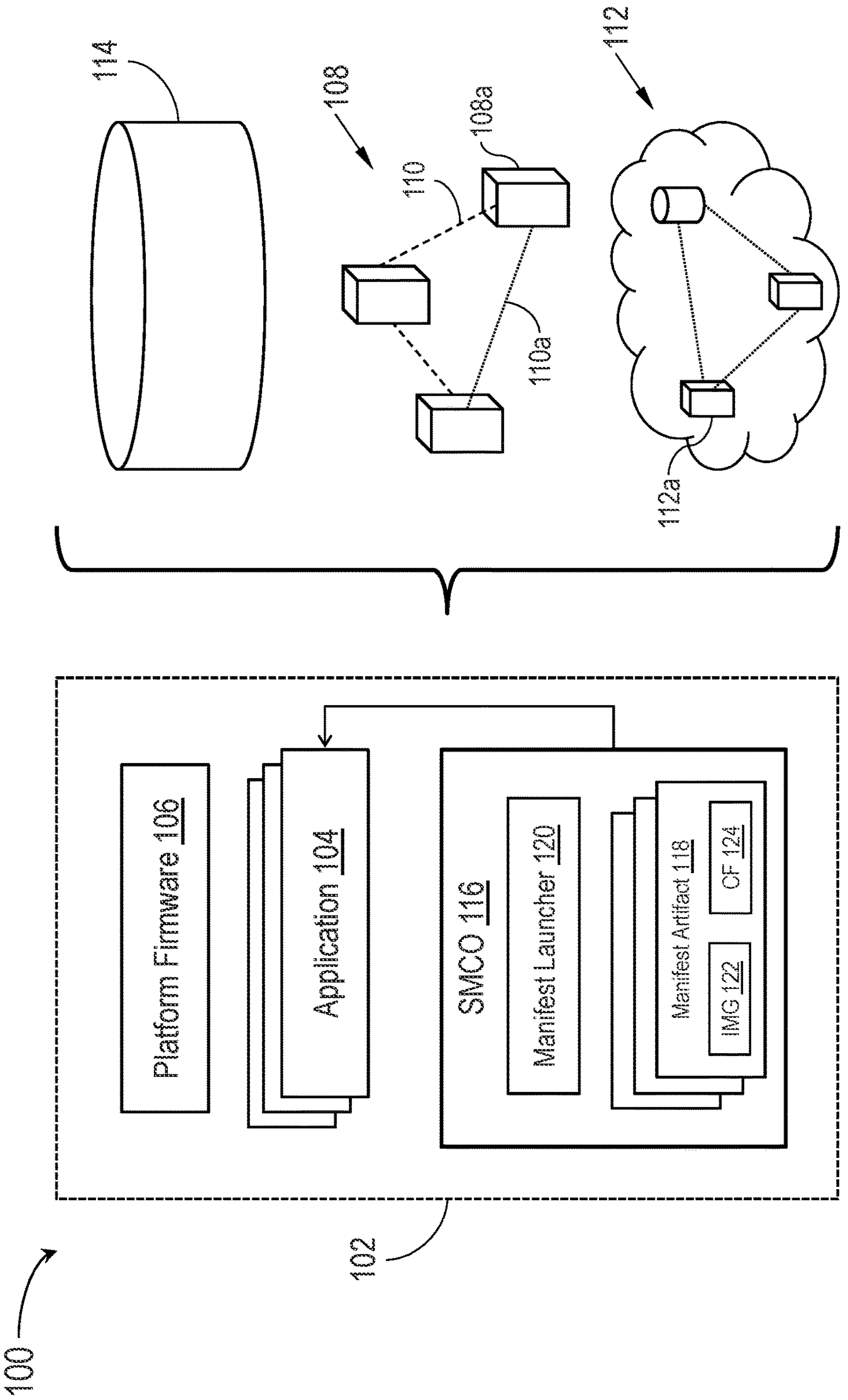
FIG. 1 is a diagrammatic illustration of a system for service management and container orchestration (SMCO) within a host environment according to one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Referring to FIG. 1, a host environment 100 is disclosed. In embodiments, the host environment 100 may include a server 102 or like physical appliance, e.g., an embedded hardware device or like computing device including one or more central processing units (CPU), a memory (e.g., random access memory (RAM)) or the like. In embodiments, the host may be defined by a host operating system (OS), one or more containerized applications 104 configured for execution on the host environment, and associated low-level platform firmware 106. In some embodiments, the host environment 100 may be distributed throughout more than one appliance (e.g., a Kubernetes cluster or other type of distributed environment). For example, distributed host environments may be distributed throughout a cluster 108 of physically connected servers or appliances (e.g., connected via Ethernet link or other like wired/physical link 110, or via wireless link 110*a*). Further, distributed host environments may include cloud-based environments 112 incorporating collections of networked processing or data storage elements 112*a*. In some embodiments, the host environment may incorporate one or more virtualized environments 114 or virtual machines (e.g., logical partitions or one of more physical appliances), the containerized applications configured for execution within a container runtime environment (CRE) within a virtualized environment.

In some embodiments the host environment 100 may be unconnected to an external network or otherwise unable to access a network connection (e.g., at run time). For example, the host environment 100 may be embodied in an appliance 102 received by a new customer or user in a pre-startup state, reset to factory defaults, or otherwise flashed. When powering up the appliance 102, it may be determined that no configuration of containers or services associated with an application 104 currently exists, or that one or more applications (and/or associated containers and services) must be started or restarted. For example, a startup of one or more applications 104 in progress may be interrupted by a restart of the appliance 102. Similarly, one or more containers or services configured for execution based on an associated application 104 may exit or enter an unhealthy state for an extended time and may require restarting. Applications 104 may be added or removed from the host environment 100, or updated to a new version, and containers and services associated with these applications must accordingly be added, removed, or updated. Conversely, an application 104 may be rolled back to a prior version (e.g., if associated containers and services fail or enter an unhealthy state subsequent to an upgrade) which may require a rollback of one or more associated containers.

In embodiments, the SMCO system 116 may be disposed within the host environment 100 and may include one or more manifest artifacts 118 (e.g., application artifacts) corresponding to an application 104 configured for execution on the host environment (e.g., within a container runtime environment (CRE)).

In embodiments, the SMCO system 116 may include a manifest launcher 120 capable of interfacing with the CRE/host environment 100 via command-line interface (CLI) tools (e.g., Docker, Docker Swarm) and software updaters to install, remove, or update applications 104 from their manifest artifacts 118. For example, software updaters within an application 104 running in the host environment 100 may determine what updates to the application are provided by the SMCO system 116, e.g., full updates or partial updates, as described in detail below. Upon approval (e.g., from an authorized customer or user associated with the host environment 100), the application 104 may request the SMCO system 116 update the application as provided for by its component manifest artifacts 118.

In embodiments, manifest artifacts 118 may include container images 122 (e.g., formatted as Tape ARchive files or "tarballs", .tar, .tar.gz) and any associated container configuration tools 124 (e.g., configurations, data, and scripts necessary for setup and deployment of containers and container suites, application version information and dependency policies (full or patch versions of applications 104, current/updated versions of associated platform firmware 106, changes to be applied), host environments and system configurations, manifest launcher update configurations) necessary for deployment to the CRE/host environment 100 of any and all containers necessary for execution of the associated application 104.

Figure 2:
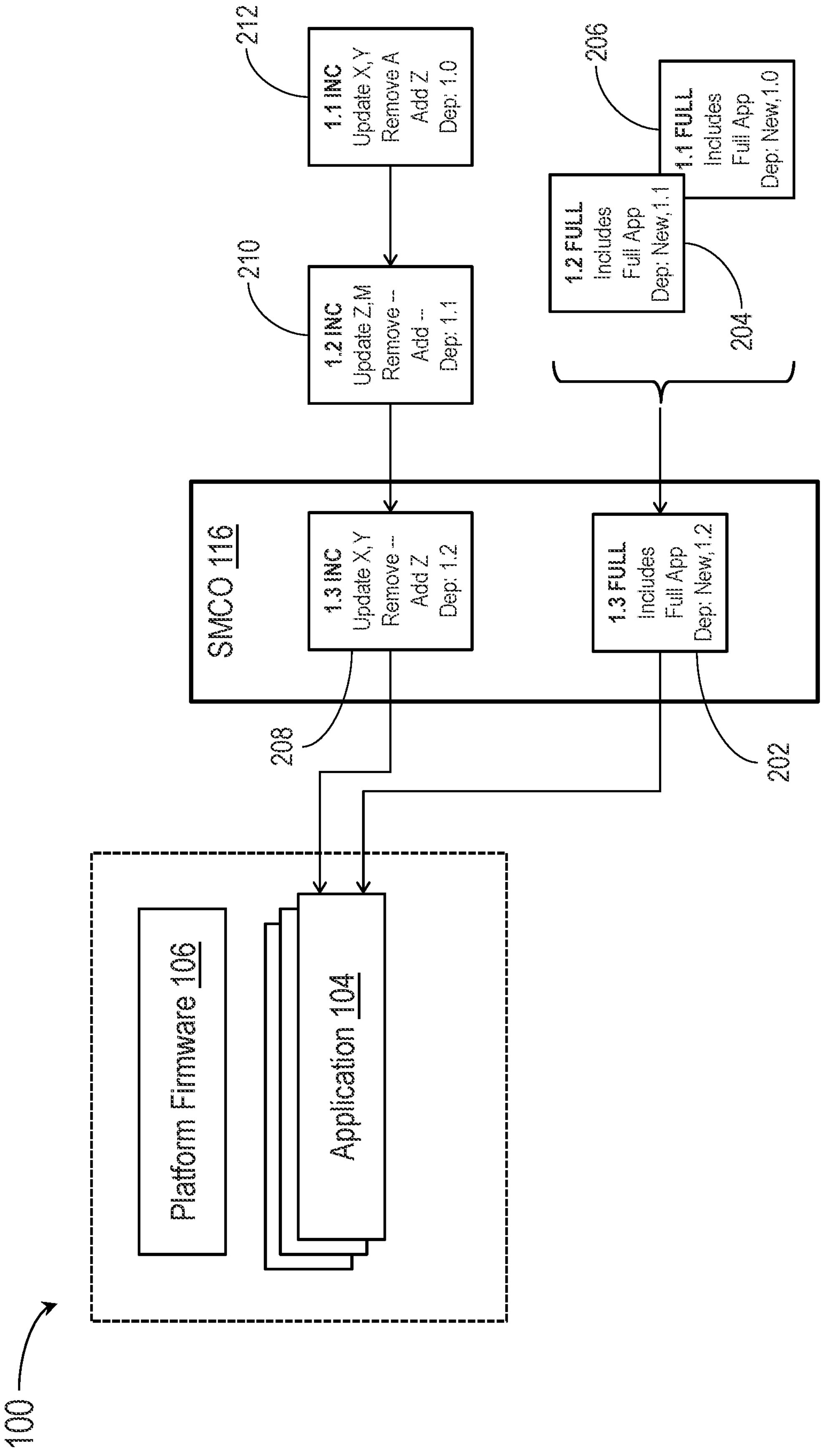
FIG. 2 is a diagrammatic illustration of the SMCO system within the host environment of FIG. 1.

Referring now to FIG. 2, the host environment 100 is shown.

In embodiments, manifest artifacts (118, FIG. 1) of the SMCO system 116 may include a full version or a partial/incremental version of an application 104 to be updated. For example, the SMCO system 116 may generate (e.g., at build time, prior to startup, if the host environment 100 is a new appliance 102), a manifest artifact 202 including a full and current version (e.g., version 1.3) of the application 104 to be updated. In embodiments, the manifest artifact 202 may include the most recently approved full version of the application 104 and may be configured to update the application in its entirety, including any necessary updates to, or versions of, associated platform firmware 106. Further, the full version 1.3 of the application 104 included within the manifest artifact 202 may be dependent on any prior full version of the application (e.g., version 1.2 (manifest artifact 204), version 1.1 (manifest artifact 206), original version 1.0 (not shown)).

In some embodiments, the SMCO system 116 may generate a manifest artifact 208 including an incremental or patch version of the application 104. For example, the patch version 1.3 incorporated by the manifest artifact 208 may depend on a specific prior version of the application 104 (e.g., version 1.2) and may include only the specific container images (122, FIG. 1), configuration tools (124, FIG. 1), services, or other resources necessary for updating version 1.2, and only version 1.2, to version 1.3 in specific incremental ways (e.g., via the updating, addition, and/or removal of specific components of the application). Similarly, the patch versions 1.2 and 1.1 incorporated by manifest artifacts 210, 212 may update only specific prior versions of the application 104 (e.g., versions 1.1 and 1.0, respectively).

Figure 3:
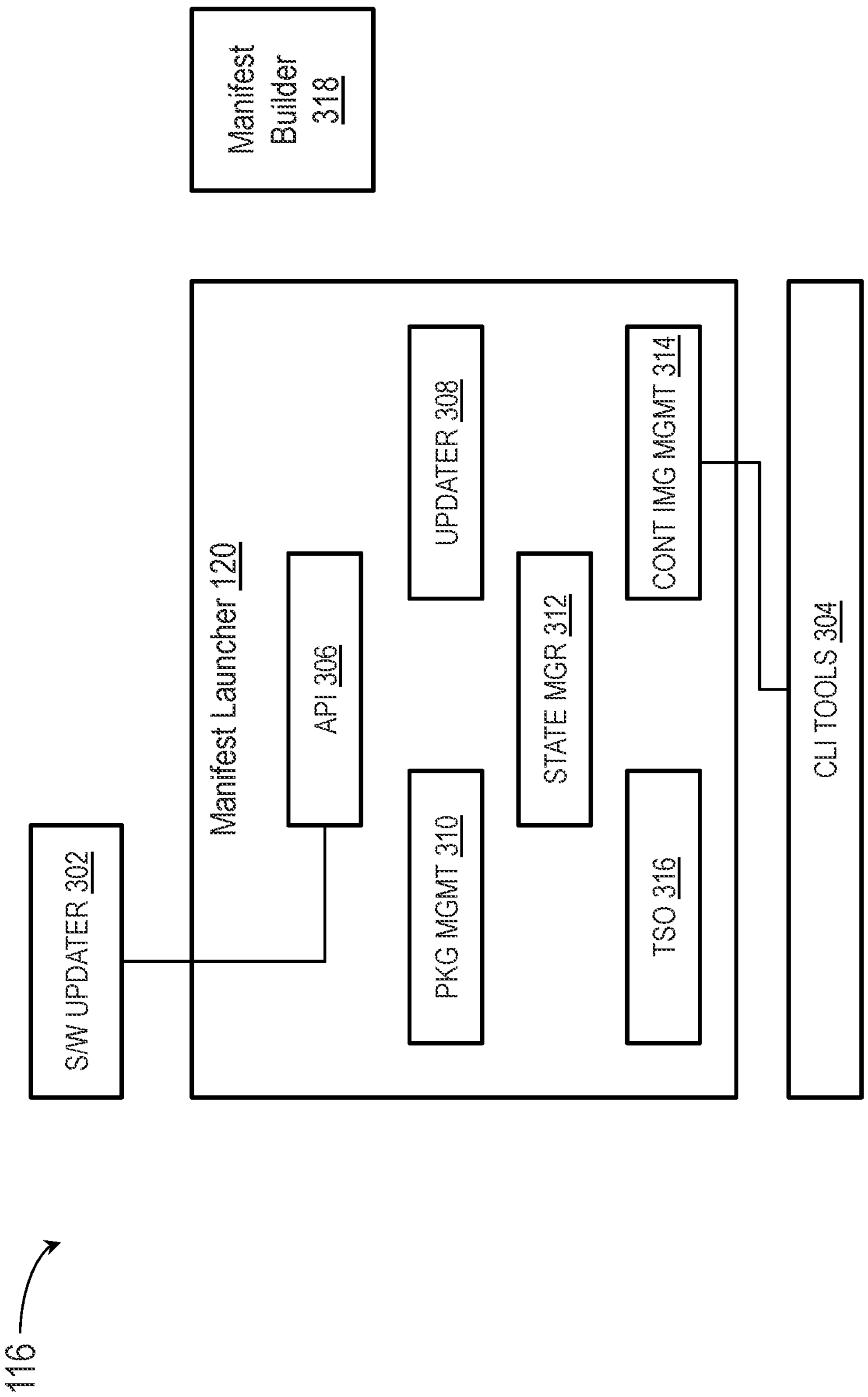
FIG. 3 is a diagrammatic illustration of components of the SMCO system of FIG. 1.

Referring to FIG. 3, the SMCO system 116 is shown. In embodiments, the SMCO system 116 may include one or more software (SW) updaters 302, a command line interface 304 (CLI; e.g., Docker) tools, and the manifest launcher 120.

In embodiments, the manifest launcher 120 may execute full or patch installations of an associated application (104, FIG. 1) (add, remove, update), e.g., at startup or in response to a software update request, based on the associated application packages in the manifest artifact (118, FIG. 1; e.g., container images (122, FIG. 1) used by the package in "tarball" form, command line tools (e.g., YAML docker compose), and/or package deployment data such as package and image names for the local container registry). For example, the manifest launcher 120 may include programmatic API 306 (e.g., Google Remote Procedure Calls (gRPC)) for initiating updates (e.g., based on requests received from the software updater/s 302). Further, the manifest launcher 120 may include updaters 308 and package managers 310 for downloading and expanding a manifest artifact 118 into component container images 122. In embodiments, the updater 308 may further update a desired state of the application, and inform the state manager 312 of the change in state. Further, the package manager 310 may handle requests to load container images 122 into the local container repository (via container image management 314) or requests to retain packages not currently being used (e.g., in the event of rollback activity).

In embodiments, the state manager 312 may retrieve a current and/or desired state of any containers, and may retrieve drift reports indicative of observed drift, e.g., differences between the current and desired states of a given container (for example, at startup or reboot if firmware has been upgraded or restored to factory default). For example, the transition state operator 316 may be notified of any detected drift, and may take steps to transition a current application state to match the desired state (e.g., adding, removing, or updating services to re-apply the latest desired state). Further, the transition state operator 316 may perform rollbacks if necessary (e.g., container failure/unhealthy states) and update the state manager 312 as to the success or failure of requested state transitions. In embodiments, container image management 314 may be responsible for executing requests by the package manager 310 to load container images 122 into the local container repository. Additionally, container image management 314 may be responsible for periodic "garbage collection", e.g., cleanup of unused container images 122, configuration tools 124, or any other unused CRE objects from the local container repository (see, e.g., FIG. 4 below).

Figure 4:
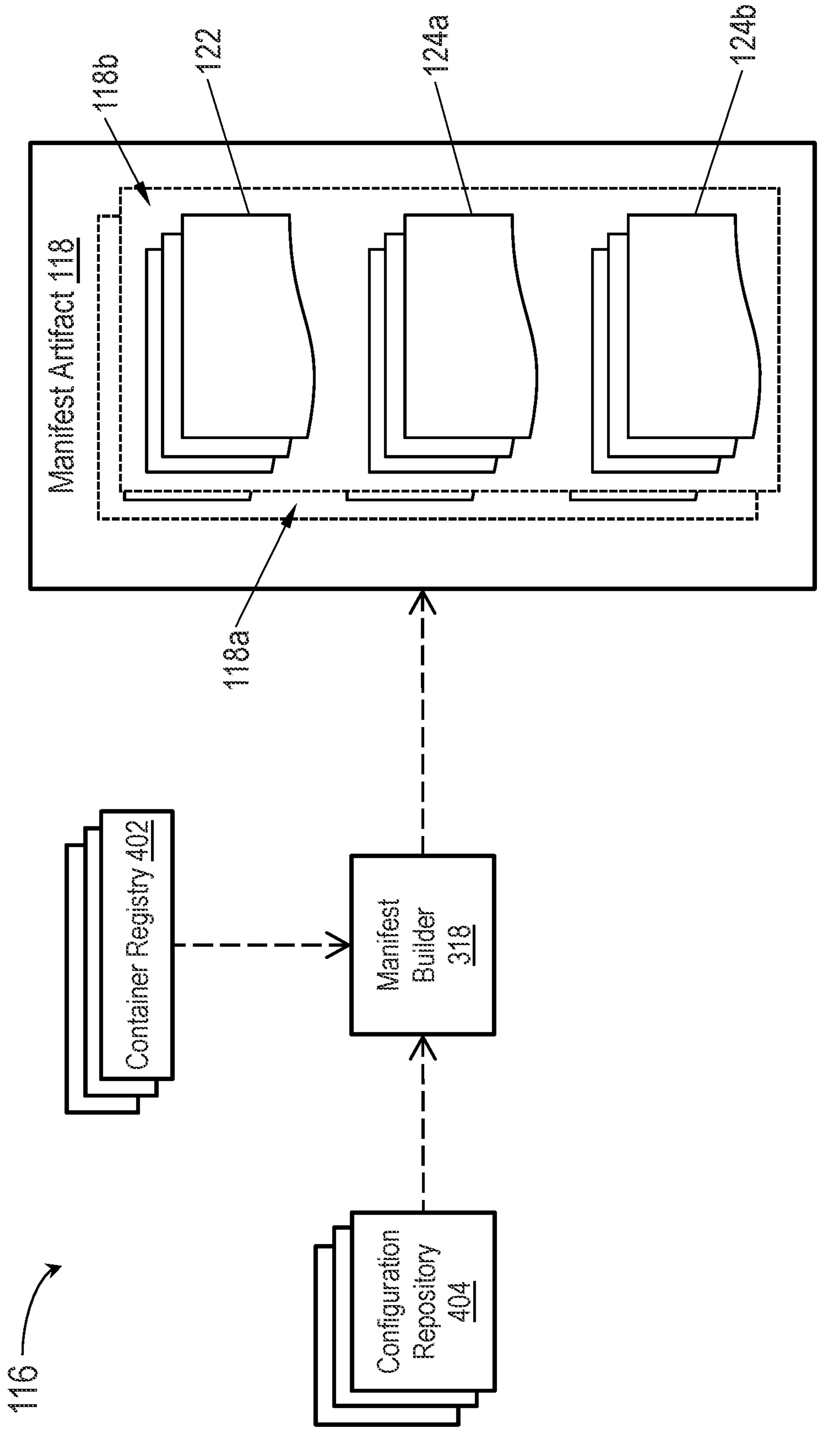
FIG. 4 is a diagrammatic illustration of build time operations of the SMCO system of FIG. 1 according to one or more embodiments of the present disclosure.

Referring also to FIG. 4, the SMCO system 116 may additionally include a manifest builder 318. For example, the manifest builder 318 may (e.g., at build time) generate manifest artifacts 118 by downloading containers (e.g., from container registries 402) and any associated configuration tools 124 retrieved from configuration repositories 404 (e.g., container configurations, data, and scripts (124*a*) necessary for setup and deployment of containers and container suites to the CRE/host environment (100, FIG. 1) as well as additional configuration data 124*b*, e.g. application version information and dependency policies, host environments and system configurations, manifest launcher update configurations) from remote registries, converting the downloaded containers into container images 122 (e.g., tarball format (.tgz, .tar.gz., etc.).

In embodiments, at build time the manifest builder 318 may package or assemble manifest artifacts 118 by incorporating full or partial updates for one or more applications 104 (e.g., application artifacts 118*a-b*; 202-212, FIG. 2), along with any container images 122 required for the application (e.g., in tarball form; it should be noted that some containers or container suites may be shared by more than one application) along with any associated configuration tools 124 as described above.

Figure 5:
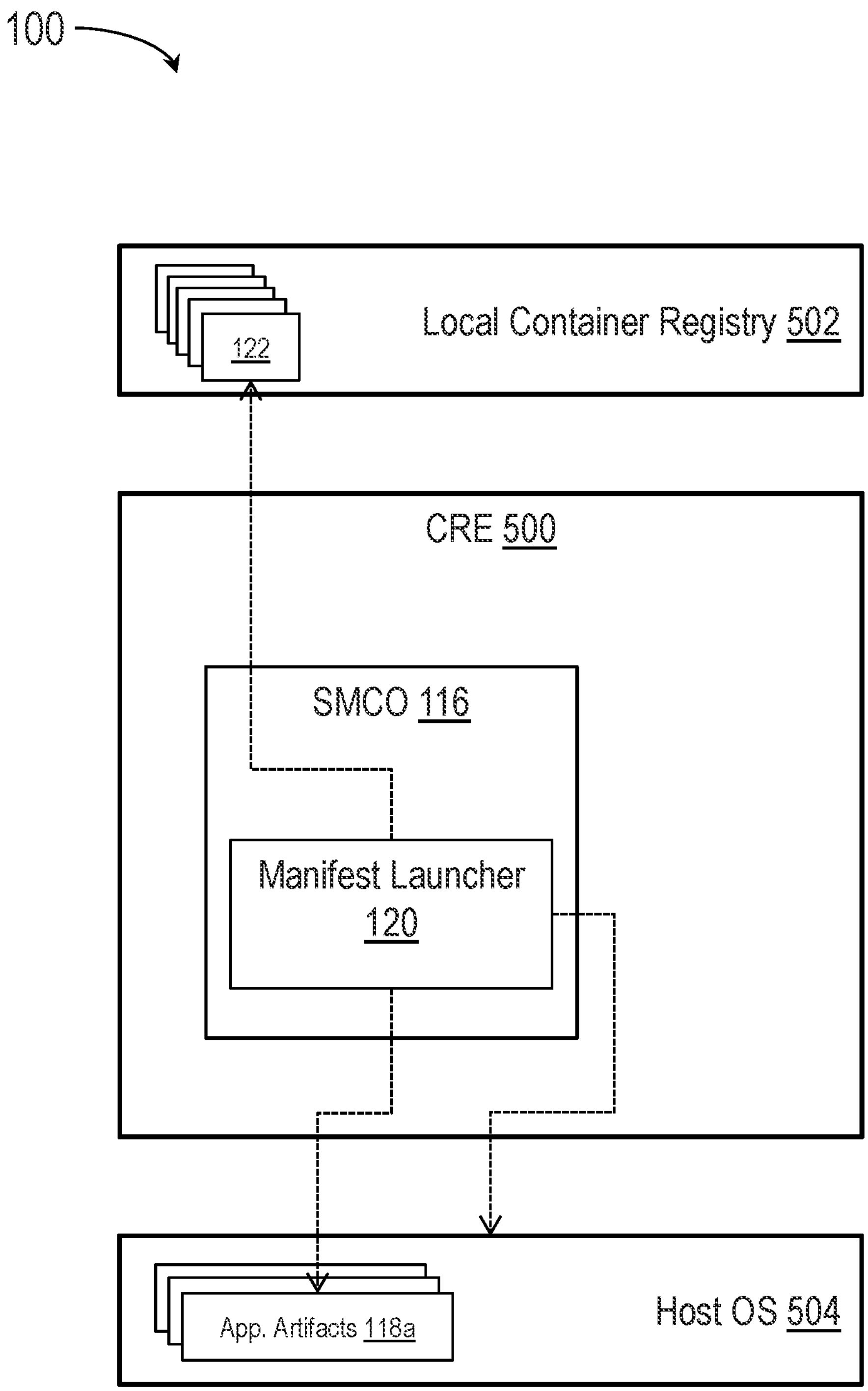
FIG. 5 is a diagrammatic illustration of runtime operations of the SMCO system within the host environment of FIG. 1.

Referring also to FIG. 5, the host environment 100 and container runtime environment 500 (CRE) thereof is shown.

In embodiments, at runtime the manifest launcher 120 of the SMCO system 116 may consume manifest artifacts (118, FIG. 4; (e.g., either pre-loaded into the host environment 100 or packaged by the manifest builder (318, FIG. 4) as shown above) to populate the local container registry 502 with any associated containers/container images 122 or container suites as needed by the associated application (104, FIG. 1). For example, the manifest launcher 120 may create and/or configure (e.g., via configuration tools (124, FIG. 1; 124*a-b*, FIG. 4) any associated data and volumes, secrets and networks for the associated application/s within the CRE. Similarly, the manifest launcher 120 may perform any necessary reconfigurations to the host operating system 504 (OS).

In embodiments, as shown by FIGS. 4 and 5, a manifest artifact 118 may incorporate more than one application artifact 118*a-b* and/or application 104, each individual application including any associated container images 122 or container suites and configuration tools 124, 124*a-b*. For example, the manifest launcher 120 may install, update, or launch one application 104 at a time, but may also switch the "personality" of a multi-use appliance (108, 112, 114: FIG. 1) or host environment 100 among one or more different monitored applications or application modes as needed or desired. For example, the host environment 100 and/or an active application 104 running thereon may be distributed among multiple nodes or appliances (e.g., distributed environment 108, cloud-based environment 112), and the manifest launcher 120 may shift the configuration between modes of the active application 104, each mode defined by a different configuration of the application, e.g., each mode running on a particular node or appliance (108*a*, 112*a*: FIG. 1) or group thereof.

It is contemplated that the SMCO system 116 may have numerous advantages. For example, the host environment 100 may provide consistent availability of application resources (e.g., in the event of an installation, removal, update, or rollback) without relying on a stable network connection. Even if the host environment 100 is contained within a single appliance without network capability, reliable configuration of the CRE 500 for one or more applications 104 may be assured.

Figure 6:
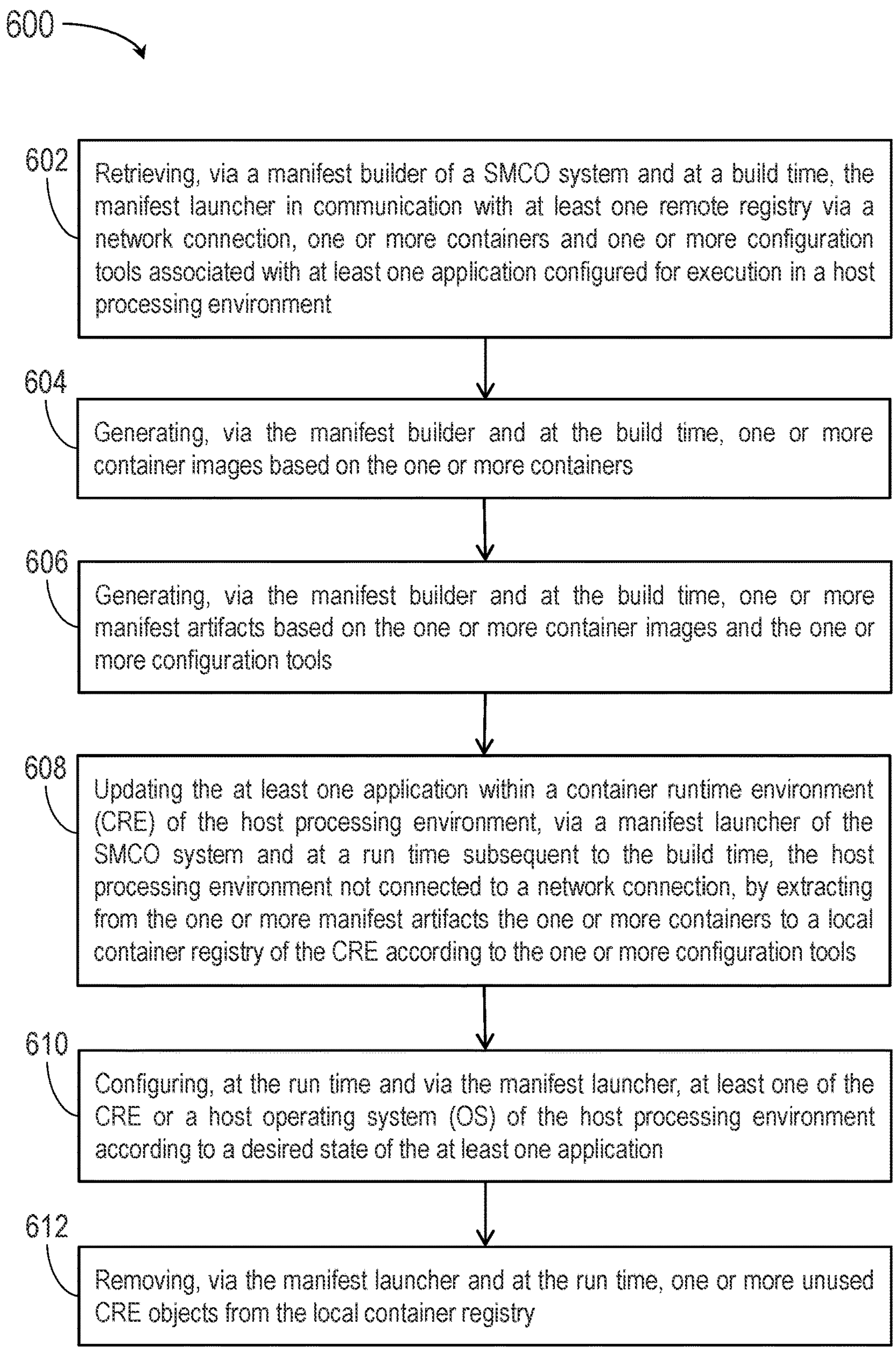
FIG. 6 is a process flow diagram illustrating a method for service management and container orchestration according to one or more embodiments of the present disclosure.

Referring now to FIG. 6, the method 600 may be implemented by the SMCO system 116 within a host environment 100 and may include the following steps.

At a step 602, at a build time the manifest builder of the SMCO system retrieves from remote registries containers and configuration tools for one or more applications to be updated, the applications running on the host environment.

At a step 604, the manifest builder generates at the build time container images based on the retrieved containers.

At a step 606, the manifest builder generates at the build time manifest artifacts for each application to be updated based on the container images and associated configuration tools.

At a step 608, a manifest launcher of the SMCO system, at a runtime subsequent to the build time when the host environment is not connected to a network, updates the application with a container runtime environment (CRE) of the host environment by extracting containers from the manifest artifacts and into local container registries of the CRE, as provided for by configuration tools of the manifest artifacts. For example, the SMCO system may execute a full installation (e.g., pre-startup) of the application, or a full application update from any prior version to a current version. In some embodiments, the SMCO system may execute a patch or partial application update, updating via specific component updates, additions, or removals a specific prior version of the application to a specific current version.

At a step 610, the manifest launcher, at the runtime, configures the CRE and/or host OS of the host environment based on a desired state of the updating/updated application.

In some embodiments, the method may include an extra step 612. At the step 612, the manifest launcher removes, at the runtime, unused CRE objects from the local container registries.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be implemented (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be implemented, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment). Those having skill in the art will recognize that the subject matter described herein may be implemented in an analog or digital fashion or some combination thereof.

Those having skill in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. Furthermore, it is to be understood that the invention is defined by the appended claims.

We claim:

1. A system for service management and container orchestration (SMCO) within a host environment, the system comprising:

a memory storing one or more computer programs;

one or more processors configured to execute the one or more computer programs;

one or more manifest artifacts associated with at least one application configured for execution on the host environment, each manifest artifact loadable to the host environment and comprising:

one or more container images;

and one or more configuration tools;

wherein the host environment is embodied in a host appliance, and wherein the host appliance is unable to access a network connection at a run time;

and the one or more computer programs comprising at least one manifest launcher configured to at least one of install, update, or remove, at the run time, the at least one application in a container runtime environment (CRE) of the host environment by:

consuming the one or more manifest artifacts;

populating a local container registry of the host environment according to the one or more configuration tools with one or more of a container, a container image, or a container suite associated with the at least one application based on the consumption of one or more manifest artifacts;

and configuring at least one of the CRE or a host operating system (OS) of the host environment according to a desired state of the at least one application.

2. The system for SMCO within the host environment of claim 1, wherein the manifest launcher is configured to remove one or more unused CRE objects from the local container registry.

3. The system for SMCO within the host environment of claim 2, wherein one or more unused CRE objects are selected from a group including:

one or more unused containers;

one or more unused container images;

or one or more unused configuration tools.

4. The system for SMCO within the host environment of claim 1, wherein the host environment is embodied in at least one of a virtualized appliance or a virtualized processing environment.

5. The system for SMCO within the host environment of claim 1, wherein:

the one or more manifest artifacts is associated with a full application corresponding to an application version;

and updating the at least one application includes installing the at least one application within the CRE according to the application version.

6. The system for SMCO within the host environment of claim 1, wherein:

the at least one application is installed within the CRE according to a first application version;

and the one or more manifest artifacts is associated with a patch application dependent on the first application version, the patch application configured to update the at least one application according to a second application version.

7. The system for SMCO within the host environment of claim 1, further comprising:

at least one manifest builder in communication with at least one remote registry via a network connection, the manifest builder configured for, at a build time prior to the run time:

retrieving one or more containers and the one or more configuration tools from the at least one remote registry;

generating the one or more container images based on the one or more containers, the one or more container images associated with at least one container image format;

and generating the one or more manifest artifacts based on the one or more container images and the one or more configuration tools.

8. A method for service management and container orchestration (SMCO), the method comprising:

retrieving, via a manifest builder of a SMCO system and at a build time, a manifest launcher in communication with at least one remote registry via a network connection, one or more containers and one or more configuration tools associated with at least one application configured for execution in a host processing environment embodied in a host appliance;

generating, via the manifest builder and at the build time, one or more container images based on the one or more containers;

generating, via the manifest builder and at the build time, one or more manifest artifacts based on the one or more container images and the one or more configuration tools;

at least one of installing, updating, or removing the at least one application within a container runtime environment (CRE) of the host processing environment, via the manifest launcher of the SMCO system and at a run time subsequent to the build time, wherein the host processing environment is unable to access a network connection at the run time, by consuming the one or more manifest artifacts to populate a local container registry of the CRE according to the one or more configuration tools with one or more of a container, a container image, or a container suite associated with the at least one application;

and configuring, at the run time and via the manifest launcher, at least one of the CRE or a host operating system (OS) of the host processing environment according to a desired state of the at least one application.

9. The method of claim 8, further comprising:

removing, via the manifest launcher and at the run time, one or more unused CRE objects from the local container registry.

10. The method of claim 8, wherein at least one of installing, updating, or removing the at least one application within the CRE of the host processing environment includes:

fully installing the at least one application within the CRE according to at least one application version.

11. The method of claim 8, wherein the at least one application is installed within the CRE according to an application version, and wherein at least one of installing, updating, or removing the at least one application within the CRE of the host processing environment includes:

fully reinstalling the at least one application within the CRE according to the application version.

12. The method of claim 8, wherein the at least one application is installed within the CRE according to a first application version, and wherein at least one of installing, updating, or removing the at least one application within the CRE of the host processing environment includes:

partially updating the at least one application according to a second application version dependent on the first application version.

* * * * *